| | United States Patent [19] | | [11] | 4,253,984 |
|---|---|---|---|---|
| Imai et al. | | | [45] | Mar. 3, 1981 |

[54] CATALYST COMPONENT FOR USE IN THE POLYMERIZATION OF α-OLEFINS AND A METHOD OF USING THE SAME

[75] Inventors: Masafumi Imai, Ooi; Hiroshi Ueno, Namekawa; Naomi Inaba, Ooi; Makoto Yoda, Kawagoe; Shozo Wada, Zushi, all of Japan

[73] Assignee: Toa Nenryo Kogyo Kabushiki Kaisha, Tokyo, Japan

[21] Appl. No.: 59,791

[22] Filed: Jul. 23, 1979

[30] Foreign Application Priority Data

Jul. 28, 1978 [JP] Japan ................................. 53/91536

[51] Int. Cl.³ .............................. C08F 4/02; C08F 4/64
[52] U.S. Cl. .............................. 252/429 B; 252/431 R; 252/431 C; 526/125
[58] Field of Search ........... 252/429 B, 429 C, 431 R, 252/431 C

[56] References Cited

U.S. PATENT DOCUMENTS

| 3,094,568 | 6/1963 | Hay et al. ...................... 252/429 B X |
| 3,990,903 | 11/1976 | Wristers ........................... 252/429 B |
| 4,021,599 | 5/1977 | Kochnar et al. ............. 252/429 B X |
| 4,086,185 | 4/1978 | Shirai et al. ....................... 252/429 B |
| 4,107,415 | 8/1978 | Giannini et al. ............. 252/429 B X |

*Primary Examiner*—Patrick Garvin
*Attorney, Agent, or Firm*—M. B. Kurtzman

[57] ABSTRACT

A supported titanium catalyst component is produced by cogrinding in the presence of an ethylenically unsaturated hydrocarbon an organo aluminum catalyst component with a supported titanium (IV) halide on a magnesium halide until the intensity of the 14.8° and 30.2° x-ray diffraction peak of magnesium halide are reduced in intensity. The resulting supported titanium halide catalyst component, when employed with an organo aluminum catalyst component to form a catalyst system is highly useful for the stereoregular polymerization of α- olefins as well as the copolymerization of α-olefins.

26 Claims, No Drawings

CATALYST COMPONENT FOR USE IN THE POLYMERIZATION OF α-OLEFINS AND A METHOD OF USING THE SAME

BACKGROUND OF THE INVENTION

This invention relates to an improved catalyst component and a catalyst system for use in the polymerization of α-olefins and a method of using the same, and more particularly, this invention pertains to a catalyst component for use in the polymerization of α-olefins, wherein the improved catalyst component is obtained by adding a desired quantity of an organo aluminum compound to a supported titanium (IV) halide for the polymerization of α-olefins, subjecting the mixture to a mechanical grinding treatment in the presence of a desired quantity of an ethylenically unsaturated hydrocarbon and in a preferred embodiment, subjecting further to removal of the hydrocarbon and to a mechanical grinding treatment. The invention further pertains to a catalyst system comprising the improved catalyst component and an organoaluminum cocatalyst, and a process for the polymerization of α-olefins using the catalyst system comprising the improved catalyst component, whereby the particle property, stereoregularity of the polymer are improved and catalyst activity during polymerization is improved.

Of late, various efforts have been made in the stereoregular polymerization of α-olefins using a catalyst system comprising a supported titanium halide catalyst component and an organo aluminum catalyst component.

For the preparation of a supported titanium catalyst component in such a case, there has been proposed a method comprising ball milling anhydrous magnesium chloride, an organic acid ester and silicon chloride and contacting the resulting support with liquid titanium tetrachloride with heating to thus support the titanium component (Japanese patent application (OPI) No. 16,986/1973 Published Mar. 3, 1973). The inventors have also proposed a method comprising ball milling anhydrous magnesium chloride, an organic acid ester and titanium tetrachloride and treating the co-ground product with a hydrocarbon solution of hexachloroethane (U.S. patent application Ser. No. 29,081, filed Apr. 11, 1979), a method comprising ball milling anhydrous magnesium chloride, an organic acid ester, titanium tetrachloride and hexachloroethane (U.S. patent application Ser. No. 29,083, filed Apr. 11, 1979) and a method comprising subjecting the co-ground product to an activation treatment with a hydrocarbon solution of hexachloroethane (U.S. patent application Ser. No. 29,082, filed Apr. 11, 1979).

However, these methods having a grinding step yield catalysts having a wide particle size distribution. When α-olefins are polymerized using a catalyst having a wide particle size distribution, the resulting polymers also manifest a wide particle size distribution and the finely powdered polymers cause clogging of a filter cloth. This is an undesirable result in the practice on a commercial scale.

In order to prevent formation of a fine powder polymer, it is possible to employ a method comprising sieving a ground catalyst product and using the obtained catalyst having a desired particle size distribution. This method, however, results in a lowered yield of titanium catalyst and high cost.

For the purpose of preparing a titanium catalyst component with a narrow particle size distribution, there has also been proposed a method comprising preparing magnesium chloride support with a relatively uniform particle size and immersing the magnesium chloride in titanium tetrachloride, followed by heating (Japanese patent application (OPI) Nos. 65,999/1974, published June 26, 1974 and 38,590/1977, published Mar. 25, 1977). In accordance with this method, a special step for the preparation of the support is required and there is only obtained a product having a low stereoregularity.

Japanese patent application (OPI) Nos. 30,681/1978, published Mar. 25, 1978, published Mar. 22, 1978 describes a so-called double stage process, i.e., comprising an initial polymerization at a low temperature and a real polymerization, whereby the polymerization activity, stereoregularity and bulk density are improved, but this process is carried out by solution polymerization, not by polymerization in a liquid monomer.

In the prior art technique as set forth above, it is impossible to obtain a supported titanium (IV) catalyst component having a satisfactorily high activity, excellent durability of activity during polymerization, high stereoregularity and which is capable of suppressing formation of a fine powder polymer in bulk polymerization, and when using this catalyst component, the polymer yield per titanium although is sufficiently high, the polymer yield per weight of the catalyst (including the support) is not sufficient so as to be able to eliminate the ash removal step.

SUMMARY OF THE INVENTION

It is an object of the present invention to provide a supported titanium catalyst component and catalyst system having a high polymerization activity, excellent durability of activity during polymerization, high stereoregularity and capable of suppressing formation of polymer powder fines in the polymerization of α-olefins and a process for the polymerization of α-olefins using the same, which process is favorable on a commercial scale.

In accordance with the present invention, there is provided a catalyst component and catalyst system for use in the polymerization of α-olefins, the catalyst component being obtained by adding an organo aluminum catalyst component, e.g., an organo aluminum compound or a mixture or adduct of an organo aluminum compound and electron donative compound in a desired quantity to a supported titanium catalyst component on a support of magnesium chloride, prepared from a magnesium halide, tetravalent titanium halide, electron donating compound (Lewis base) and optionally one or more fourth components selected from the group consisting of organo halogen compound and halogen-containing compounds of Group IVa elements of Periodic Table except carbon and subjecting the mixture to a mechanical grinding treatment in the presence of an ethylenically unsaturated hydrocarbon. In accordance with another embodiment of the invention, the unsaturated hydrocarbon remaining after the initial grinding is removed and the mixture is subjected to a mechanical grinding treatment in an atmosphere of inert gas. In accordance with yet another embodiment of the invention there is provided a process for the homopolymerization of α-olefins or the copolymerization thereof with ethylene or other α-olefins using the thus obtained catalyst component in combination with an organo aluminum cocatalyst with the foregoing advantages or effects.

The important feature of the present invention comprises a supported titanium catalyst component which is subjected to mechanical grinding in the presence of an organo aluminum catalyst component and ethylenically unsaturated hydrocarbon and, in general, the mechanical grinding is carried out with the polymerization of the ethylenically unsaturated hydrocarbon to thus obtain a catalyst component for the polymerization of $\alpha$-olefins with a decreased amount of fine particles.

DETAILED DESCRIPTION OF THE INVENTION

The present invention will now be illustrated in order and in detail.

I. Catalyst component and treating agent (1) Magnesium halide

The magnesium halide, in particular, anhydrous magnesium dihalide used in the present invention includes $MgCL_2$, $MgBr_2$ and $MgI_2$. $MgCl_2$ is preferably employed. These anhydrous magnesium dihalides can be those synthesized by any methods and commercially sold compounds can be used. The magnesium dihalide should be substantially anhydrous, the presence of water being allowed to such an extent that the catalytic performance is not affected. Usually, the commercially sold anhydrous magnesium dihalide, prior to use, is subjected to a dehydration treatment in conventional manner, for example, by calcining at a temperature of 100° C. to 400° C. under reduced pressure for 1 to 10 hours.

(2) Titanium (IV) halide

Typical examples of tetravalent titanium halide used in the present invention are $TiCl_4$, $TiBr_4$ and $TiI_4$. However, it is not always necessary that all the anions be halogens, a part thereof can be substituted by alkoxy, acyloxy or alkyl groups. Preferably $TiCl_4$ is employed in accordance with the present invention.

(3) Electron donative compound (Lewis base)

Examples of the electron donative compound used in the present invention are organic carboxylic acids, organic carboxylic acid esters, alcohols, ethers, ketones, amines, amides, nitriles, aldehydes, alcoholate, phosphorus, arsenic and antimony compounds combined with organic groups through carbon or oxygen, phosphoamides, thioethers, thioesters and carbonic acid esters. In particular, organic acid esters are preferably used.

The organic acid esters are esters formed by condensation of saturated or unsaturated aliphatic, alicyclic and aromatic mono- or polycarboxylic acids and aliphatic, alicyclic and araliphatic mono- or polyols. Illustrative examples of these esters are butyl formate, ethyl acetate, butyl acetate, ethyl acrylate, ethyl butyrate, isobutyl isobutyrate, methyl methacrylate, diethyl maleate, diethyl tartrate, ethyl hexahydrobenzoate, ethyl benzoate, ethyl p-methoxybenzoate, methyl p-methylbenzoate, ethyl p-tert-butylbenzoate, dibutyl phthalate, diallkyl phthalate and ethyl $\alpha$-naphthoate. The organic acid esters are not intended to be limited to these examples. Above all, alkyl esters of aromatic carboxylic acids, in particular, $C_1$ to $C_8$ alkyl esters of nucleus-substituted benzoic acids such as p-methylbenzoic acid and p-methoxybenzoic acid, or benzoic acid are preferably used.

(4) Fourth component (organo halogen compounds and halogen-containing compounds of Group IVa elements of Periodic Table except carbon or having the skeletons of the elements)

Typical examples of the organo halogen compound used optionally as the fourth component for the preparation of the supported titanium (IV) halide on a magnesium halide according to the present invention are mono- and polyhalo-substituted products of saturated or unsaturated aliphatic, alicyclic and aromatic hydrocarbons. Illustrative, but non-limiting examples of aliphatic compounds are methyl chloride, methyl bromide, methyl iodide, methylene chloride, methylene bromide, methylene iodide, chloroform, bromoform, iodoform, carbon tetrachloride, carbon tetrabromide, carbon tetraiodide, ethyl chloride, ethyl bromide, ethyl iodide, 1,2-dichloroethane, 1,2-dibromoethane, 1,2-diiodoethane, methylchloroform, methylbromoform, methyliooodoform, 1,1,2-trichloroethylene, 1,1,2-tribromoethylene, 1,1,2,2-tetrachloroethane, hexabromoethane, n-propyl chloride, 1,2-dichloropropane, hexachloropropylene, octachloropropane, decabromobutane and chlorinated paraffins. Illustrative of alicyclic compounds are chlorocyclopropane, tetrachlorocyclopentane, hexachloropentadiene and hexachlorocyclohexane. Illustrative of aromatic compounds are chlorobenzene, bromobenzene, o-dichlorobenzene, p-dichlorobenzene, hexachlorobenzene, benzotrichloride and p-chlorobenzotrichloride. In addition to these halo substituted hydrocarbons, it is possible to use halo substituted oxygen-containing compounds, for example, hexachloroacetone, chloro acetic acid ester, trichloroacetic acid esters and the like. Above all, polyhalo substituted products, in particular, polychloro substituted products of aliphatic hydrocarbons are preferably used, and most preferably, carbon tetrachloride, 1,1,2-trichloroethylene, 1,1,2,2-tetrachloroethane, hexachloroethane and octachloropropane are used.

As the halogen-containing compound of Group IVa elements of Periodic Table, except carbon, having the skeletons of such Group IVa elements, which can be used as the fourth component according to the present invention, for example, are halogen compounds of silicon, germanium, tin, lead or their homologues.

Typical examples of the halogen compound of silicon represented by the general formula $Si_mX_{2m+2}$, (wherein m is generally an integer of 1 to 10), are polyhalosilanes such as tetrahalosilanes, hexahalodisilanes, octahalotrisilanes, decahalotetrasilanes, dodecahalopentasilanes, tetradecahalohexasilanes, docosahalodecasilanes and the like. In these polyhalosilanes, the halogen atoms may be same or different. Preferable silanes employed in accordance with this invention are tetrahalosilanes corresponding to m=1 in the above general formula, for example, tetrachlorosilane, tetrabromosilane, tetraiodosilane, trichlorobromosilane, trichloroiodosilane, trichlorofluorosilane, dichlorodibromosilane, dichlorodiodosilane, chlorotribromosilane, chlorotriiodosilane and tribromoiodosilane. Tetrachlorosilane is most preferable because of being readily obtainable on a commercial scale. Moreover, a part of the halogens in the above described halosilane homologues can be replaced by one or more of alkyl, aryl, aralkyl, vinyl, alkoxy and acyl groups.

Typical examples of the halogen compound of germanium represented by the general formula $GeX_m$, wherein X is a halogen and m is an integer of 2 or 4, are $GeCl_2$, $GeBr_2$, $GeI_2$, $GeCl_4$, $GeBr_4$ and $GeI_4$ and particularly, $GeCl_2$ and $GeCl_4$ are preferably used. A part of the halogens in the above described halogermanium compounds can be replaced by one or more of alkyl, aryl, aralkyl, vinyl, alkoxy and acyl groups.

Typical examples of the halogen compound of tin represented by the general formula $SnX_m$, wherein X and m have the same meanings as described above, are $SnCl_2$, $SnBr_2$, $SnI_2$, $SnCl_4$, $SnBr_4$, $SnI_4$, $SnCl_3Br$, $SnCl_2Br_2$, $SnBr_3Cl$, $SnBr_2I_2$ and $SnCl_2I_2$, and particularly, $SnCl_2$ and $SnCl_4$ are preferably used. A part of the halogens in the above described halotin compounds can be replaced by one or more of alkyl, aryl, aralkyl, vinyl, alkoxy and acyl groups.

Typical examples of the halogen compound of lead represented by the general formula $PbX_m$, wherein X and m have the same meanings as described above are $PbCl_2$, $PbCl_4$, $PbBr_2$, $PbBr_4$, $PbI_2$ and $PbI_4$ and particularly, $PbCl_2$ and $PbCl_4$ are preferably used. A part of the halogens in the above described halolead compounds can be replaced by one or more of alkyl, aryl, aralkyl, vinyl, alkoxy and acyl groups.

Of the halogen compounds of Group IVa elements of Periodic Table as set forth above, organo halogen compounds and halosilane compounds are most preferably used.

The various halo compounds can also be used individually or in combination.

(5) Organo aluminum compound

The organo aluminum compound used in the present invention is an organo aluminum compound represented by the general formula $R_mAlX_{3-m}$, wherein R is an alkyl group or aryl group, X is a halogen anion and m is a numeral of $1 < m \leq 3$, or a mixture or complex compound thereof. For example, trialkylaluminums are used, and in addition to the trialkylaluminums, there are preferably used as an organo aluminum compound to be used jointly with the trialkylaluminums, alkylaluminum compounds having 1 to 18 carbon atoms, in particular, 2 to 6 carbon atoms, such as dialkylaluminum monohalies, monoalkylaluminum dihalides and alkylaluminum sesquichloride, mixtures or complex compounds thereof.

Examples of the trialkylaluminum are trimethylaluminum, triethylaluminum, tripropylaluminum and triisobutylaluminum. Examples of the dialkylaluminum monohalide are dimethylaluminum chloride, diethylaluminum chloride, diethylaluminum bromide, diethylaluminum iodide and diisobutylaluminum cloride. Examples of the monoalkylaluminum dihalide are methylaluminum dichloride, ethylaluminum dichloride, ethylaluminum dibromide, ethylaluminum diiodide and isobutylaluminum dichloride. Example of the alkylaluminum sesquihalide is ethylaluminum sesquichloride. In particular, it is preferable to use triethylaluminum, triisobutylaluminum and as one to be used jointly with them, diethylaluminum chloride and ethylaluminum sesquichloride, or mixtures or complex compounds thereof, because these compounds are readily obtainable commercially and exhibit excellent effects.

(6) Ethylenically unsaturated hydrocarbon

The ethylenically unsaturated hydrocarbon used for the preparation of the catalyst component for the polymerization of α-olefins according to the present invention includes $C_2$–$C_{20}$ aliphatic mono-α-olefins such as ethylene, propylene, butene-1, pentene-1, hexene-1, octene-1 and 4-methylpentene-1, $C_8$–$C_{10}$ aromatic substituted olefins such as styrene, α-methylstyrene, p-methylstyrene and divinylbenzene, alicyclic substituted olefins such as vinylcyclohexane and vinylcyclohexene, and alicyclic unsaturated hydrocarbons such as norbornene, 4-methylnorbornene and norbornadiene. Above all, aliphatic mono-α-olefins are preferably used. The α-olefin used herein may be same as or different from that used in the stereoregular polymerization to be effected later, but it is more preferable to use the same α-olefin as that of the stereoregular polymerization or the component used in the copolymerization.

(7) Hydrocarbon

The hydrocarbon which can be used, for example, in the preparation of the supported titanium halide or in the polymerization of α-olefins according to the present invention is dehydrated in conventional manner and includes aliphatic hydrocarbons having 3 to 20 carbon atoms such as propane, butane, isobutane, pentane, n-hexane, n-heptane, isooctane, decane and liquid paraffins, alicyclic hydrocarbons having 5 to 12 carbon atoms such as cyclopentane, cyclohexane, methylcyclohexane, ethylcyclohexane, decalin and dimethyldecalin, and aromatic hydrocarbons having 6 to 12 carbon atoms such as benzene, toluene, o-xylene, p-xylene, m-xylene, mixed xylenes, ethylbenzene, dimethylnaphthalene and tetralin, gasoline and kerosene.

II. Preparation of supported titanium (IV) halide on magnesium halide

The present invention can be applied to titanium (IV) halides supported on magnesium halides prepared by various methods (which will hereinafter be referred to as "titanium-containing solid"). The embodiments thereof will be given in the following, but the present invention is not intended to be limited thereby.

(1) A titanium-containing solid obtained by subjecting a system comprising (a) a magnesium halide, (b) tetravalent titanium halide, (c) electron donative compound and (d) fourth component to a co-grinding and-/or contacting treatment, (2) A titanium-containing solid obtained by treating the titanium-containing solid obtained in (1) with a hydrocarbon and/or fourth component, (3) A titanium-containing solid obtained by subjecting a system comprising (a) a magnesium halide, (c) electron donative compound and (d) fourth compound to a co-grinding and/or contacting treatment to prepare a support composition; contacting the support composition with a tetravalent titanium halide under heating in the presence or absence of a solvent, and then treating with a hydrocarbon and/or fourth component under heating or at room temperature, (4) A titanium-containing solid obtained by subjecting a system comprising (a) a magnesium halide, (b) tetravalent titanium halide and (c) electron donative compound to a co-grinding and/or contacting treatment, (5) A titanium-containing solid obtained by treating the titanium-containing solid of (4) under heating with a hydrocarbon and/or the fourth component (d) and (6) A titanium-containing solid obtained by co-grinding (a) a magnesium halide and (b) tetravalent titanium halide to obtain a titanium-containing solid and further treating the titanium-containing solid under heating with a hydrocarbon and/or electron donative compound (c).

For example, the titanium-containing solid (1) will now be illustrated in detail.

The supported titanium catalyst component is obtained by subjecting (a) a anhydrous magnesium dihalide, (b) tetravalent titanium halide, (c) electron donative compound and (d) fourth component to a co-grinding and/or contacting treatment in various manners. That i, for the production thereof, adding methods and conacting orders or procedures of these compounds can be aried suitable, but it is required that all of these compounds are finally brought into contact with each other. The co-grinding and/or contacting treatment is preferaly carried out as to the following systems each comrising a combination of these compounds and, more referably, it is carried out by mechanical grinding sing a vibration mill, ball mill, and the like.

(i) mixtures of (a), (b), (c) and (d),
(ii) mixtures of (b), (d) and a complex (e) formed reviously from (a) and (c),
(iii) mixtures of (a), (d) and a complex (f) formed reviously from (b) and (c),
(iv) mixtures of (b), (c) and a complex (g) formed reviously from (a) and (d),
(v) mixtures of (f) and (g),
(vi) mixtures of (d), (f) and (d),
(vii) mixtures of (a), (f) and (d), and
(viii) mixtures of (d) and a complex (h) formed previusly from (a) and (f). Above all, a method of forming reviously a complex is preferably selected from wet rocess of dry process mechanical grinding treatments nd contacting treatments in the presence or absence of solvent at room temperature or with heating, and each f the mixtures can be prepared by mixing the compoents at a time or in a suitable order.

In accordance with the present invention, it is necesary to effect grinding until there is produced a change f intensity in the peaks of 14.8° (strong) and 30.2° (midle) of the characteristic peaks ($2\theta$) in the X-ray diffracon (45 KV×45 mA, CuK source, Ni filter) or anhyrous magnesium chloride used as a support, although e time of mechanical grinding depends upon the rinding efficiency, grinding system, grinder structure, uantity of starting materials charged, voids, temperare, etc. More preferably, the grinding is carried out to ach an extent that the peak of 14.8° becomes dull with n increased width and the 30.2° peak loses its intensity a great extent. For example, inthe case of charging 10 50 g of a mixture in a vibration mill of 300 ml in inner olume, having 100 steel balls of 10 m/m in diameter nd grinding at a vibration width of 1 to 3 m/m and a ibration number of 1400 rpm, the grinding time is sually 1 to 200 hours, preferably 10 to 100 hours.

The quantity of a titanium halide on the support is referably 0.1 to 10% by weight as titanium metal. An ectron donative compound is preferably used in a roportion of 0.1 to 10 mols, particularly, 0.5 to 5 mols 1 gram atom of the supported titanium metal and a urth component is preferably used in a proportion of to 100% by weight, particularly, 5 to 50% by weight the anhydrous magnesium halide.

According to the above described method, a complex omposed of (a), (b), (c) and (d) can be obtained in the rm of a flowable solid even if the fourth component sed is liquid.

The supported titanium catalyst component obtained this way does not have a large surface area and a rge pore volume, that is, it has a surface area of about to about 15 m$^2$/g and pore volume of about 0.01 to out 0.02 cc/g, but when used in combination with an rgano aluminum catalyst component, it is capable of iving a high stereoregularity with holding a high polyierization activity in the homopolymerization of $\alpha$-olens or the copolymerization thereof with ethylene or ther $\alpha$-olefins.

The titanium-containing solid prepared by the foregoing procedure contains fine particles. When polymerization of $\alpha$-olefins is carried out using a catalyst system comprising this titanium-containing solid as a titanium catalyst component and an organo aluminum catalyst component, therefore, the resulting poly-$\alpha$-olefins contain a large quantity of finely powdered polymers of 100 mesh or less. In the case of using the titanium-containing solids (2) to (6), the particle size and particle size distribution also cause the production of finely powdered polymers of 100 mesh or less in a considerable proportion.

III. Polymerizing and grinding treatment

The essence of this invention which results in the elimination of polymer fines is the grinding treatment of the above described titanium-containing solid in the presence of an organo aluminum compound and an ethylenically unsaturated hydrocarbon.

The grinding treatment in accordance with the invention is a treatment wherein the titanium-containing solid and organo aluminum catalyst component are subjected to mechanical grinding in the presence of an ethylenically unsaturated hydrocarbon. During this grinding treatment, the ethylenically unsaturated hydrocarbon is polymerized and simultaneously ground. The ethylenically unsaturated hydrocarbon is decreased with the progress of the mechanical grinding, so it is necessary to add a previously predetermined quantity of it or to fill up suitably during the mechanical grinding. In accordance with one preferred embodiment of the invention, a catalyst component for the polymerization of $\alpha$-olefins, having more excellent properties, can be obtained by, after the mechanical grinding in the presence of an ethylenically unsaturated hydrocarbon, removing the hydrocarbon and further carrying out a mechanical grinding treatment in vacuum or in an atmosphere of inert gas.

A non-limiting embodiment of the present invention will in detail be illustrated, for example, as to the titanium-containing solid prepared by the method of II-(1) described above.

When or after a magnesium halide (a), tetravalent titanium halide (b), electron donative compound (c) and organo halogen compound (d) are finally mixed, a predetermined quantity of one or more of the organo aluminum compounds is added and the mixture is subjected to a mechanical grinding treatment when or after a predetermined quantity of the ethylenically unsaturated hydrocarbon of I-(6) is added to the system at a time or intermittently and polymerized, thus obtaining a catalyst component for the polymerization of $\alpha$-olefins with less fine particles.

If the additive amounts of the organo aluminum compound and ethylenically unsaturated hydrocarbon are too large, the flowability of a titanium catalyst component is undesirably greatly reduced, while if too small, fine particles cannot be reduced.

The additive amount of the organo aluminum compound can widely be selected as far as the above described requirement is satisfied, however, it is generally 0.05 to 5 mols, preferably 0.1 to 1.0 mol and most preferably 0.3 to 0.7 mol per 1 gram atom of titanium. During the same time, it is not always essential to use an electron donating compound with the organo aluminum compound, but it is desirable to use it in a proportion of 0.1 to 10 mols, preferably 0.5 to 2 mols to 1 mol of the organo aluminum compound.

In the addition of the organo aluminum compound and electron donative compound, a solvent as shown in I-(7) can be used, but it is advantageous to use no solvent so as to simplify subsequent processings. These two materials can be added individually, but it is convenient to add them after preforming an adduct thereof.

For the purpose of mixing and dispersing evenly the organo aluminum catalyst component with the titanium-containing solid, after added, it is desirable to effect a mechanical mixing operation. This mixing can be sufficiently accomplished in 30 minutes, for example, by the use of a vibration mill as set forth above.

The quantity of ethylenically unsaturated hydrocarbon to be used can be varied widely within such a range that the supported titanium catalyst can give a desired flowability and particle property, but it is ordinarily 0.5 to 100% by weight, preferably about 1 to 20% by weight, most preferably 3 to 10% by weight based on the catalyst solid. Feeding of an ethylenically unsaturated hydrocarbon can be carried out all at once or intermittently in the form of either gas or liquid and in the presence or absence of a molecular weight regulator such as hydrogen or an inert gas, optionally selecting suitable temperature and pressure condition. These conditions can suitably be combined considering the convenience of operations.

The polymerization can be carried out with suitable agitation, but it is desirable in order to achieve the advantages or effects of the present invention to a maximum extent to effect the polymerization with mechanically grinding, for example, using a vibration mill or ball mill. When using the vibration mill, for example, the time for the polymerizing and grinding treatment is sufficiently 5 hours or less. Through this treatment, a yellow titanium-containing solid is changed to a color of gray green. In the thus obtained titanium-containing solid, the surface area and pore volume are rather decreased than before the treatment, but there is found no remarkable change in X-ray diffraction pattern in comparison with before the treatment.

When the titanium-containing solid obtained by this treatment is subjected to a particle size measuring device of light transmission type, it has a larger average particle size than the ground product of II and titanium halide and a largely decreased content of fine particles of 10 microns or less.

It has been surprisingly discovered that when the polymerization is carried out without the mechanical grinding, such an effect is not found or when a polymer and a titanium-containing solid obtained by the procedure II are subjected to mechanical grinding in a time similar to the present treatment, both the materials remain as separate particles with fine particles not being substantially eliminated.

Therefore, it is not considered that according to the present treatment, the finely powdered titanium-containing solid adheres only to the polymer formed in the system by the grinding treatment to increase the particle diameter. It is not clear what structure the ground product in the present treatment has, but in view of the above described results of the comparative examples, it can be assumed that a polymer acting as a binder is formed on active points dispersed microscopically on a support and thus the polymer is highly dispersed in microcrystalline order so that the fine particles are effectively aggregated during the grinding step consisting of repetitions of grinding and aggregating and the polymer itself is hardly aggregated to each other. Thus, there can be obtained a titanium-containing solid which has a suitable particle size and excellent flowability and is free from being massive.

When homopolymerization of α-olefins or copolymerization thereof with ethylene or other α-olefins is carried out in the presence of a catalyst comprising, in combination, the titanium-containing solid subjected to this treatment as a titanium catalyst component and an organo aluminum catalyst component such as described above, formation of finely powdered polymer is suppressed to a greater extent and the polymerization activity is held, i.e., the polymer yield is increased with the passage of time, as compared with the case of using the titanium catalyst component free from this treatment.

IV. Mechanical grinding treatment under ethylenically unsaturated hydrocarbon-removed state When the titanium-containing solid after the grinding treatment of III is further subjected to removal of the ethylenically unsaturated hydrocarbon and to further mechanical grinding for a suitable period of time in vacuum or in a gaseous atmosphere or inert gas, for example, lower saturated hydrocarbons such as methane, ethane, propane and butane, nitrogen, argon and helium in the presence or absence of an inert solvent such as described in I-(7), not only the polymerization activity and stereoregularity are improved to a greater extent than in the case of using the titanium catalyst component obtained by the treatment III, but also the polymerization activity of the finally prepared catalyst is increased. It is unexpected that the polymer yield is increased with the passage of time, the stereoregularity is scarecely lowered during the same time and there is formed little fine powder polymer with a particle size of 100 mesh of less.

Furthermore, it is found that even if an aluminum catalyst component per a titanium catalyst component is decreased to great extent as compared to that employed in the prior art, a sufficiently high polymerization activity and stereoregularity are held or increased.

The time required for the present treatment is not limited, but, for the commercial convenience, it is preferably selected from 30 minutes to 2 hours. The titanium-containing solid obtained by this treatment shows the similar surface area and pore distribution to the titanium-containing solid obtained by the treatment III and there is found no marked difference in the X-ray diffraction patterns. The color of the powder is gray green or that tinged somewhat with yellow. Macroscopic differences from the product of III consist in that the particles exhibit a better flowability and the presence of fine particles with a particle diameter of 10 microns or less can be neglected.

The reason why the above described effects or advantages are obtained is not clear, but these effects are possibly due to that the polymer as a binder is more highly dispersed in microcrystalline order without influences due to the new growth than in the polymerizing and grinding treatment to thus aggregate the fine particles effectively, and new active points are further formed by the grinding. This cannot be achieved by polymerizing an ethylenically unsaturated hydrocarbon on a titanium-containing solid only or by subjecting a polymer and titanium-containing solid to a grinding treatment for a period of time corresponding to the sum of III and IV only.

That is to say, when polymerization of α-olefins is carried out in the presence of a catalyst comprising the titanium catalyst component obtained by this treatment and an organo aluminum catalyst component, a number of advantages are obtained that the yield of poly-α-olefins per titanium and per whole catalyst weight is increased with the passage of time, removal of halogens or aluminum can be made unnecessary or can be largely lightened, the stereoregularity during the same time is only slightly lowered and formation of a finely powdered polymer with a particle size of 100 mesh or less is largely suppressed.

The generally used organo aluminum compound for composing an organo aluminum catalyst component used in the stereoregular polymerization of α-olefins can be chosen from those mentioned in I-(5) and may be same as or different from that used in the polymerizing and grinding treatment.

When the above described organo aluminum compound only is used with the supported titanium catalyst component for the polymerization of α-olefins in the presence of a molecular weight regulator such as hydrogen, the yield of a stereoregular polymer is remarkably decreased. Therefore, as the organo aluminum catalyst component of the present invention, there are used complexes consisting of, in combination, organo aluminum compounds and one or more selected from the group of electron donating compounds described in the foregoing section of the catalyst component.

A suitable electron donative compound may be same as or different from that used in the preparation of the supported titanium catalyst component. Their ratio is chosen within a range of 0.1 to 10 gram atoms, preferably 1 to 5 gram atoms of aluminum in the organo aluminum compound to 1 mol of the electron donative compound. Preparation of the organo aluminum catalyst component is carried out by contacting an organo aluminum compound and electron donative compound, for example, by mixing them at room temperature merely or while using a suitable hydrocarbon, for example, n-hexane or n-heptane as a diluent. The organo aluminum catalyst component is ordinarily prepared before a polymerization reaction, but, in general, it is preferably used within 1 hour after the complex is prepared since the stereoregularity is unfavorably affected if it is used after storage of the complex for a long time.

The catalyst system of the present invention can be used for the polymerization of α-olefins, in particular, for the stereospecific polymerization of α-olefins having 3 to 6 carbon atoms, for example, propylene, butene-1, 4-methyl-pentene-1 and hexene-1 and for the copolymerization of the above described α-olefins with each other and/or with ethylene. This copolymerization includes random copolymerization and block copolymerization. In the case of using ethylene as a comonomer, its proportion is generally chosen within a range of up to 30% by weight, in particular, 1 to 15% by weight to α-olefins. A polymerization reaction using the catalyst of the present invention is carried out under the commonly used conditions.

The reaction can be carried out in any of a gaseous phase and liquid phase and for the reaction of liquid phase, any of inert hydrocarbons and liquid monomers can be used. A suitable solvent, which can be used in the polymerization in a solvent, is selected from the foregoing hydrocarbons. The polymerization temperature is generally −80° C. to 150° C., preferably 40° C. to 100° C. The pressure ranges from 1 to 40 atm, for example. Control of the molecular weight during polymerization is carried out in conventional manner using hydrogen or other known molecular weight regulators. This polymerization method can be carried out continuously or batchwise. The organo aluminum catalyst component is utilized for the polymerization reaction and further serves to catch various poisons introduced into the system. Thus, it is necessary to control the additive quantity of the organo aluminum catalyst component considering the quantities of catalyst poisons contained in α-olefins, solvents and various gases, in particular, when using a high activity catalyst as in the present invention, and the organo aluminum catalyst component is ordinarily used so as to satisfy an Al/Ti atomic ratio of 1 to 2000, preferably 50 to 1000 based on titanium in the supported titanium catalyst component.

When polymerization is carried out according to the present invention, the polymerization activity is improved and maintained with a high durability for the passage of time, while a high stereoregularity is held, and, consequently, the steps of removing the catalyst and removing atactic polymers becomes useless or the load thereon is markedly reduced.

The process of the present invention is particularly important for the production of isotactic polypropylene, random copolymers of ethylene and propylene and block copolymers of propylene and ethylene.

The present invention will now be illustrated in detail by the following examples without limiting the same, in which percents are to be taken as those by weight unless otherwise indicated. The polymerization activity or catalyst efficiency (which will hereinafter be referred to as "C.E.") is the quantity (g) of a polymer formed per 1 g of titanium and per 1 g of whole catalyst. The heptane-insoluble component (which will hereinafter be referred to as "H.I.") to show the proportion of a crystalline polymer in the polymers means the residual quantity (% by weight) in the case of extracting the product with boiling n-heptane for 6 hours by means of a Soxhlet extractor of improved type. The melt flow rate ("M.F.R.") is measured according to ASTM-D 1238.

EXAMPLE 1

(1) Preparation of titanium-containing solid 29 g (59.6%) of anhydrous magnesium chloride, 9.6 g (19.8%) of an equimolar complex of titanium tetrachloride and ethyl benzoate $TiCl_4 \cdot C_6H_5CO_2C_2H_5$ and 8.4 g (20.6%) of hexachloroethane were charged in a stainless steel (SUS 32) mill pot with an inner volume of 300 ml carrying 100 stainless steel (SUS 32) balls with a diameter of 10 mm in a nitrogen atmosphere, which was then fitted to a shaker, followed by shaking for 61.5 hours. The obtained titanium-containing solid was yellow and had a titanium content of 2.4%. The surface area of the solid measured by the BET method was 6.5 $m^2/g$ and the pore volume was 0.019 cc/g. X-ray diffraction analysis (45 KV×45 mA; $CuK_\alpha$ ray source; Ni filter) showed that the peaks of 14.8° and 34.8° of the characteristic peaks (2θ) of anhydrous magnesium chloride became dull with increased widths and the peaks of 30.2° and 63° disappeared, while there was scarcely found a change in the peak of 50.3°.

According to measurement of the particle size distribution by a light transmission type device, the titanium-containing solid coground by the shaking mill had a smaller particle size than the anhydrous magnesium chloride as the starting material and there were fine particles of 10 microns or less.

(2) Grinding treatment 24.0 g of the titanium-containing solid obtained by the above described method, 1.20 g of triisobutylaluminum corresponding to 0.5 aluminum gram atom per 1 gram atom of the titanium and 0.91 g of ethyl benzoate being equimolar to the triisobutylaluminum were mixed, held for 5 minutes and charged in the above described mill pot, which was then fitted to a shaker, followed by shaking for about 10 minutes to mix evenly the titanium-containing solid, triisobutylaluminum and ethyl benzoate. Then, the shaking was carried out for 30 minutes while introducing propylene intermittently into the mill pot. The resulting solid was a gray green flowable powder containing 4.5% of polypropylene and having a titanium content of 2.2%.

The above described titanium-containing solid had a larger grain size than the titanium-containing solid obtained in (1) and the anhydrous magnesium chloride as the starting material, and contained a very small amount of fine particles of 10 microns or less.

Polymerization of an α-olefin using the thus obtained titanium-containing solid is carried out by the following procedure. 60.5 mg of the above described titanium-containing catalyst component (Ti supporting ratio: 2.2%), 1 mol/1 n-heptane solution of 0.91 g of triethylaluminum corresponding to 300 Al gram atoms per 1 gram atom of the titanium and 0.37 g of ethyl p-anisate corresponding to 0.29 mol per 1 gram atom of aluminum in the triethylaluminum were mixed, held for 5 minutes and charged in a stainless steel (SUS 32) autoclave with an inner volume of 1000 ml, equipped with a stirrer, in an atmosphere of nitrogen. In addition, 0.6 l of hydrogen gas as a molecular weight regulator and 0.8 l of propylene were introduced under pressure into the system, which was then heated to 68° C., and the polymerization was carried out for 30 minutes.

After the polymerization, the unreacted propylene was purged and 174 g of a white powdered polypropylene was obtained corresponding to C.E. of PP (polypropylene) 130 Kg/g-Ti and PP 2870 g/g-catalyst. H.I.=92.6%, MFR of the polymer=4.1. A finely powdered polymer with a grain particle of 100 mesh or less in the resulting polymer amounted to 2.9%.

When the similar polymerization operation was carried out for a lengthened polymerization time of 1 hour, C.E. was PP 211 Kg/g-Ti and PP 4640 g/g-catalyst and H.I. was 92.0. The proportion of a finely powdered polymer with a particle size of 100 mesh or less was 2.5%. The amount of the polymer formed was markedly increased by lengthening the polymerization time, from which it was apparent that the activity was maintained at a high level during the same time.

(3) Postgrinding treatment 20 g of the solid subjected to the polymerizing and grinding treatment in (2) (titanium content: 2.2%) was taken in the mill pot and further shaken for 1.5 hours in an atmosphere of nitrogen to effect grinding. The titanium-containing solid obtained by this treatment was a gray yellow and green powder with a higher flowability than that of (2) and with little fine particles.

50.4 mg of the postground solid thus obtained, 0.79 g of triethylaluminum (Al/Ti atomic ratio: 300) and 0.37 g of ethyl p-anisate (Al compound/ethyl benzoate molar ratio: 3.4) were mixed and held for 5 minutes. Using the resulting titanium catalyst component with an organo aluminum catalyst component, the similar operation was carried out using an organo aluminum catalyst component to the polymerization of the polymerization (2).

The resulting polypropylene amounted to 211.2 g corresponding to C.E. of PP 191 Kg/g-Ti and PP 4200 g/g-catalyst. H.I. was 94.3%. The proportion of a finely powdered polymer with 100 mesh or less was only 2%. When the similar operation was carried out for a lengthened polymerization time of 1 hour, C.E. was PP 307 Kg/g-Ti and 6750 g/g-catalyst and H.I. was 93.0%. A finely powdered polymer of 100 mesh or less was formed in such an amount as could not be determined.

When the aluminum atomic ratio in the organo aluminum catalyst component to the titanium atom in the titanium catalyst component was reduced and polymerization was carried out for 30 minutes, C.E. was PP 253 Kg/g-Ti and PP 5560 g/g-catalyst and H.I. was 93.3.

Even when the Al/Ti atomic ratio was reduced to about ⅓ as described above, C.E. was improved and H.I. was not so decreased. This means that the content of the aluminum ash in the polymer was ⅓ or less.

COMPARATIVE EXAMPLE 1

The procedure of Example 1-(2) was repeated except using the titanium-containing solid (Ti content: 2.4%) obtained in Example 1-(1). After the polymerization for 30 minutes, there were obtained results of C.E. PP 131 Kg/Kg-Ti and PP 3140 g/g-catalyst, H.I. 91.2 and MFR of 3.2. The quantity of a fine powder polymer with a particle size of less than 100 mesh was 9.5%.

When the polymerization time was lengthened to 1 hour, C.E. was PP 154 g/g-Ti and PP 3690 g/g-catalyst and H.I. was 90.9. The quantity of a finely powdered polymer of 100 mesh or less was 9.0%.

It is apparent from these results that when the polymerizing and grinding treatment of the present invention is carried out, the polymerization activity is increased, and a fine powder polymer is decreased, and when the postgrinding treatment is carried out, the polymerization activity is further improved to a large extent, H.I. is raised and a fine powder polymer is further decreased. On the other hand, when the polymerizing and grinding treatment is not carried out as in Comparative Example, the polymerization activity per whole catalyst is low and there is considerable formation of fine powder polymer.

COMPARATIVE EXAMPLE 2

20 g of the titanium-containing solid obtained in Example 1-(1) was charged in a 300 ml round bottom glass flask equipped with a stirrer. 1.00 g of triisobutylaluminum corresponding to 0.5 aluminum atom per 1 g of the titanium and 0.76 g of ethyl benzoate being equimolar to the triisobutylaluminum were mixed, held for 5 minutes and then dropwise added to the titanium-containing solid over a period of 5 minutes while revolving the stirrer. The stirring was further continued for another 10 minutes so as to thoroughly mix the components. The $N_2$ gas in the flask was then purged for 10 seconds by propylene gas and the system was rinsed and substituted by an atmosphere of propylene, followed by polymerization. The polymerization was carried out under a pressure of the atmospheric pressure plus 400 mm water column while feeding propylene so that the flask would not be under reduced pressure even if the propylene was consumed by the polymerization. After 60 minutes, feeding of propylene was stopped and the system was replaced by $N_2$ gas. The resulting solid contained 5.8% of polypropylene and has a titanium content of 2.3%.

When the similar polymerization procedure to Example 1-(2) was carried out using the solid obtained in this way, there were obtained results of C.E. of PP 124 Kg/g-Ti and PP 2850 g/g-catalyst and H.I. of 91.3%. The quantity of a polymer with a particle size of 100 mesh or less was 10.0%. It is apparent from this result that formation of a fine powder polymer cannot be suppressed by the previous polymerization free from a grinding treatment only.

COMPARATIVE EXAMPLE 3

The procedure of Example 1-(1) was repeated except using 11.6 g of anhydrous magnesium chloride (59.7%), 4.0 g of an equimolar adduct of titanium tetrachloride-ethyl benzoate (20.7%) and 3.8 g of hexachloroethane (19.6%). 19.4 g of the resulting titanium-containing solid and 0.9 g of a homopolypropylene powder (H.I. 95; MFR 5.0; particle size of 100 mesh or less 1.9%; average particle size 310 microns) prepared by the prior art process using a catalyst of A-A type titanium trichloride and diethylaluminum chloride, followed by removal of atactic polymers, and being free from additives were charged in a mill pot and subjected to a grinding treatment for 3 hours in an atmosphere of nitrogen.

However, a major part of the polypropylene powder remained under the state separated from the titanium-containing solid and a homogeneous titanium-containing solid, as in the case of Example 1-(2) or (3), could not be obtained.

EXAMPLE 2

(1) Preparation of titanium-containing solid 25 g (59.2%) of anhydrous magnesium chloride, 8.8 g (20.9%) of an equimolar adduct of titanium tetrachloride and ethyl benzoate and 8.4 g (19.9%) of hexachloroethane were co-ground for 69 hours in an analogous manner to Example 1-(1) to thus obtain a titanium-containing solid containing 2.8% of titanium.

(2) Polymerization grinding treatment

The procedure of Example 1-(2) was repeated except using 40.2 g of the titanium-containing solid obtained in (1) and adjusting the grinding time to 1 hour to thus obtain a titanium-containing solid containing 6.2% of polypropylene and 2.6% of titanium.

The procedure of the polymerization example in Example 1-(2) was repeated except using the titanium-containing solid obtained in this way. In the polymerization for 30 minutes, there were obtained results of C.E. of PP 149 Kg/g-Ti and PP 3880 g/g-catalyst and H.I. of 92.9. A sieve test showed that the product contained 3.2% of a finely powdered polymer of 100 mesh or less. When the similar operation was carried out by lengthening the polymerization time to 1 hour, C.E. was PP 238 Kg/g-Ti and PP 6200 g/g-catalyst and H.I. was 92.0. The amount of a fine powder polymer of 100 mesh or less was 2.9%.

(3) Postgrinding treatment

The mill pot containing 38 g of the titanium-containing solid remained after sampling for the above described polymerization test and desired analysis was rinsed with nitrogen gas and the grinding treatment was further carried out for 1 hour, thus obtaining a titanium-containing solid in the form of a very flowable and gray yellow green powder, having a titanium content of 2.4%.

The procedure of the polymerization example in Example 1-(2) was repeated except using the titanium-containing solid obtained in this way. In the polymerization in 30 minutes, there were obtained results of C.E. of PP 175 Kg/g-Ti and PP 4550 g/g-catalyst and H.I. of 94.1. A sieve test of the polymer showed that the product contained only 0.2% of a fine powder polymer of 100 mesh or less.

When the similar polymerization was carried out with lengthening the polymerization time to 1 hour, C.E. amounted to PP 308 Kg/g-Ti and PP 8020 g/g-catalyst and H.I. was 93.0 with a slight lowering. The amount of a fine powder polymer of 100 mesh or less was only such as could not be weighed.

COMPARATIVE EXAMPLE 4

The polymerization test of Example 1-(2) was repeated except using the titanium-containing solid obtained in Example 2-(1). In the polymerization in 30 minutes, there were obtained results of C.E. of PP 150 Kg/g-Ti and PP 4210 g/g-catalyst, H.I. of 91.8% and 9.2% of a fine powder polymer of 100 mesh or less, and in the polymerization in 1 hour, there were obtained results of C.E. of PP 180 Kg/g-Ti and PP 5052 g/g-catalyst, H.I. of 91.0 and 9.0% of a fine powder polymer of 100 mesh or less.

As apparent from the above described Example 2 and Comparative Example 4, the catalytic activity, stereo-regularity and amount of a fine powder polymer formed are all improved similarly to Example 1, even if the time for the polymerizing and grinding treatment and the postgrinding treatment is varied.

EXAMPLE 3

(1) Activation treatment 40 g of the titanium-containing solid (titanium 2.8%) obtained by repeating the procedure of Example 2-(1) was taken in a 1000 ml glass vessel in an atmosphere of nitrogen. A solution of 80 g of hexachloroethane in 500 ml of n-heptane was added thereto, treated at 120° C. for 2 hours, then cooled at 70° C., filtered to separate the solution, and the resulting solid was rinsed with fresh n-heptane of 400 ml four times at the same temperature, followed by drying at room temperature under reduced pressure for 1 hour. The thus obtained titanium-containing solid is a light yellow powder containing 1.2% of titanium.

X-ray diffraction tests of the co-ground products in Example 1-(1) Example 2-(1) showed that the sharp peak of 14.8° (2θ) of anhydrous magnesium chloride, which had become dull, low and wide, recovered somewhat the sharpness by this treatment.

(2) Polymerizing and grinding treatment

The procedure of Example 1-(2) was repeated except using the activated solid obtained in (1) to thus obtain a gray yellow green and powdered titanium-containing solid containing 5.8% of polypropylene and 1.1% of titanium.

Using the thus resulting titanium-containing solid, the similar polymerization test was carried out to Example 1-(2). In the polymerization for 30 minutes, there were obtained results of C.E. of PP 195 Kg/g-Ti and PP 2150 g/g-catalyst and H.I. of 97.6. A sieve test of the polymer showed that the product contained only 3.2% of a fine powder polymer of less than 100 mesh. In the polymerization for 1 hour, there were obtained results of C.E. of PP 304 Kg/g-Ti and PP 3350 g/g-catalyst, H.I. of 97.0 and 3.0% of a fine powder polymer of 100 mesh or less.

(3) Postgrinding treatment

The procedure of Example 1-(3) was repeated except using the titanium-containing solid obtained in (2) and adjusting the grinding time to 1 hour to thus obtain a gray yellow green titanium-containing solid in the form of a flowable powder.

Using the thus resulting titanium-containing solid, the similar polymerization test to Examle 1-(2) was carried out. In the polymerization in 30 minutes, there were obtained results of C.E. of P 282 Kg/g-Ti and PP 3100 g/g-catalyst and H.I. of 98.0. The amount of a fine powder polymer of 100 mesh or less was only such as could not be weighed. When the polymerization was carried out in the polymerization time of 1 hour, there were obtained results of C.E. of PP 493 Kg/g-Ti and PP 5420 g/g-catalyst and H.I. of 97.6.

COMPARATIVE EXAMPLE 5

The procedure of the polymerization example in Example 1-(2) was repeated except using the activated titanium-containing solid obtained in Example 3-(1). In the polymerization in 30 minutes, there were obtained results of C.E. of PP 200 Kg/g-Ti and PP 2400 g/g-catalyst and H.I. of 97.4. A sieve test of the polymer showed that the product contained 9.3% of a finely powdered polymer of 100 mesh or less. In the polymerization in 1 hour, there were obtained results of C.E. of PP 240 Kg/g-Ti and PP 2880 g/g-catalyst, H.I. of 97.0 and 8.9% of a fine powder polymer of 100 mesh or less.

EXAMPLE 4

(1) Preparation of titanium-containing solid 20 g of anhydrous magnesium chloride, 6.3 g of ethyl benzoate and 4.6 g of silicon tetrachloride were charged in the shaking mill pot used in Example 1-(1) and subjected to a grinding treatment for 30 minutes to obtain a supported composition. 30 g of this supported composition was place in a schlenk tube of 200 ml, to which 150 ml of titanium tetrachloride was added. The mixture was contacted under boiling for 2 hours, cooled to 70° C., filtered to separate the solution and the residual solid was rinsed five times with 150 ml of n-heptane, followed by drying under reduced pressure, thus obtaining a powdered titanium-containing solid containing 1.6% of titanium.

(2) Polymerizing and grinding treatment

The procedure of Example 1-(2) was repeated except using 28 g of the titanium-containing solid obtained in (1) to thus obtain a powdered titanium-containing solid containing 1.3% of titanium and 6.8% of polypropylene.

Using the titanium-containing solid obtained in this way, the polymerization test was carried out in the manner of Example 1-(2). The polymerization was run for 30 minutes. The results obtained were C.E. of PP 112 Kg/g-Ti and PP 1460 g/g-catalyst, H.I. of 93.5 and 2.9% of a fine powder polymer of 100 mesh or less. In a second polymerization run for 1 hour, there were obtained results of C.E. of PP 174 Kg/g-Ti and PP 2260 g/g-catalyst, H.I. of 93.0 and 2.8% of a fine powder polymer of 100 mesh or less.

(3) Postgrinding treatment

The procedure of Example 2-(3) was repeated except using 25 g of the titanium-containing solid obtained in (2) and adjusting the grinding time to 1 hour, thus obtaining a flowable titanium-containing solid substantially free from fine particles.

Using the titanium-containing solid obtained in this way, the similar polymerization test to Example 1-(2) was carried out. After 30 minutes of polymerization, there were obtained results of C.E. of PP 150 Kg/g-Ti and PP 1950 g/g-catalyst, H.I. of 94.2 and 2.1% of a finely powdered polymer of less than 100 mesh and in the polymerization for 1 hour, there were obtained results of C.E. of PP 234 Kg/g-Ti and PP 3040 g/g-catalyst, H.I. of 93.8 and 1.8% of a fine powder polymer of less than 100 mesh.

COMPARATIVE EXAMPLE 6

The polymerization test of Example 1-(2) was repeated except using the titanium-containing solid obtained in Example 4-(1). For the polymerization in 30 minutes, there were obtained results of C.E. of PP 113 Kg/g-Ti and PP 1800 g/g-catalyst, H.I. of 93.4 and 12% of a fine powder polymer of less than 100 mesh and for the polymerization in 1 hour, there were obtained results of C.E. of PP 124 Kg/g-Ti and PP 1975 g/g-catalyst, H.I. of 93.0 and 11.5% of a fine powder polymer of less than 100 mesh.

EXAMPLE 5

(1) Preparation of titanium-containing solid 34.0 g of anhydrous magnesium chloride, and 10.3 g of an equimolar adduct of titanium tetrachloride and ethyl benzoate were used and co-ground for 64 hours in an analogous manner to Example 1-(1) to thus obtain a titanium-containing solid containing 3.0% of titanium. X-ray diffraction analysis of the solid showed that the peaks of 14.8° and 50.3° of the characteristic peaks ($2\theta$) of anhydrous magnesium chloride became dull with increased widths and the peaks of 30.2°, 34.8° and 63° disappeared.

(2) Polymerizing and grinding treatment

The procedure of Example 2-(2) was repeated except using 43.0 g of the titanium-containing solid obtained in (1) to thus obtain a titanium-containing solid containing 5.2% of polypropylene and 2.8% of titanium.

The polymerization test of Example 1-(2) was repeated except using the thus resulting titanium-containing solid. In the polymerization in 30 minutes, there were obtained results of C.E. of PP 120 Kg/g-Ti and PP 3350 g/g-catalyst and H.I. of 90.2 and in the polymerization in 1 hour, there were obtained results of C.E. of PP 163 Kg/g-Ti and PP 4560 g/g-catalyst and H.I. of 90.0. The amounts of fine powder polymers were respectively 7.4% and 7.0%, the fine powder having a particle size of 100 mesh or less.

(3) Postgrinding treatment

The procedure of Example 2-(3) was repeated except using 40.0 g of the titanium-containing solid obtained in (2) to thus obtain a titanium-containing solid containing 2.8% of titanium.

Then, the polymerization test of Example 1-(2) was repeated except using the titanium-containing solid obtained in this way. In the polymerization in 30 minutes, there were obtained results of C.E. of PP 124 Kg/g-Ti and PP 3480 g/g-catalyst and H.I. of 88.9 and in the polymerization in 1 hour, there were obtained results of C.E. of PP 175 Kg/g-Ti and PP 4900 g/g-catalyst and H.I. of 88.0. The amounts of fine powder polymers of 100 mesh or less were respectively 6.4% and 6.3%.

COMPARATIVE EXAMPLE 7

The procedure of the polymerization example of Example 1-(2) was repeated except using the titanium-containing solid obtained in Example 5-(1). In the polymerization in 30 minutes, there were obtained results of C.E. of PP 95 Kg/g-Ti and PP 2860 g/g-catalyst and H.I. of 82.2 and in the polymerization in 1 hour, there were obtained results of C.E. of PP 97 Kg/g-Ti and P 2920 g/g-catalyst and H.I. of 81.5. In this case, the value of H.I. is low, i.e., there is a large amount of atactic polymers, so the flowability of the polymer is not good and a sieve test comparable with Examples cannot be carried out.

EXAMPLE 6

Copolymerization of ethylene and propylene 29.3 mg of the titanium-containing solid obtained in Example 2-(3), 0.98 g of triisobutylaluminum and 0.22 g of ethyl benzoate were mixed, held for 5 minutes and charged in an autoclave with a capacity of 1000 ml, equipped with a stirrer, to which 0.6 l of $H_2$ and 0.8 l of liquid propylene were added, followed by raising the temperature to 68° C. and polymerizing for 60 minutes. During the same time, 4.5 g of ethylene gas was forcedly introduced into the autoclave under pressure three times every 10 minutes. Thus, there were obtained results of C.E. of copolymer 415 Kg/g-Ti and copolymer 9970 g/g-catalyst, H.I. of copolymer of 85 and ethylene content 3.1%. According to a sieve test of the polymer, formation of a fine powder polymer of 100 mesh or less was negligible.

What is claimed is:

1. A titanium-containing solid catalyst component for use in the polymerization of α-olefins, which is produced by a process comprising:
   (a) adding an organo aluminum catalyst component selected from organo aluminum compounds and mixtures of organo aluminum compounds and electron donative compounds to a supported titanium (IV) halide on a magnesium halide;
   (b) subjecting the mixture to a mechanical grinding treatment in the presence of an ethylenically unsaturated hydrocarbon until the intensity of magnesium halide x-ray diffraction peak at 14.8° is dull and the intensity of the 30.2° peak is reduced; and
   (c) recovering the resulting titanium-containing solid catalyst component.

2. The solid catalyst component of claim 1 wherein the recovered titanium-containing solid catalyst component is subjected to further mechanical grinding.

3. The solid catalyst component of claim 1, wherein the ethylenically unsaturated hydrocarbon is diluted with an inert gas and/or inert solvent.

4. The solid catalyst component of claim 2, wherein the further mechanical grinding treatment is carried out in the presence of an inert gas and/or inert solvent.

5. The solid catalyst component of claim 4, wherein the further mechanical grinding treatment is carried out in the presence of an inert gas.

6. The solid catalyst component of claim 1, wherein the supported titanium (IV) halide on magnesium halide comprises a mixture of magnesium halide, a tetravalent titanium halide, a Lewis base and a halogen compound selected from halogen-substituted hydrocarbons, halogen-substituted oxygen-containing organo compounds and halogen-containing compounds of Group IVa elements selected from the group consisting of $Si_qX_{2q+2}$, $GeX_m$, $SnX_m$ and $PbX_m$, wherein X is a halogen, alkyl, aryl, aralkyl, vinyl, alkoxy and acyl group, at least one X being halogen, q is an integer of from 1 to 10 and m is an integer of from 1 to 4.

7. The solid catalyst component of claim 6, wherein the halogen compound is a halogen-substituted hydrocarbon.

8. The solid catalyst component of claim 7, wherein the halogen-substituted hydrocarbon is a polychloro aliphatic hydrocarbon having from 1 to 4 carbon atoms.

9. The solid catalyst component of claim 8, wherein the polychloro-substituted aliphatic hydrocarbon is selected from the group consisting of carbon tetrachloride, 1,1,2-trichloroethylene, 1,1,2,2-tetrachloroethane, hexachloroethane and octachloropropane.

10. The solid catalyst component of claim 9 wherein the polychloro-substituted hydrocarbon is hexachloroethane.

11. The solid catalyst component of claim 1, wherein the ethylenically unsaturated hydrocarbon is selected from the group consisting of ethylene and α-olefins having from 3 to 20 carbon atoms.

12. The solid catalyst component of claim 6, wherein the Lewis base is an organic acid ester of a saturated or unsaturated aliphatic, alicyclic and aromatic mono- or polycarboxylic acid and an aliphatic, alicyclic and aralipathic mono- or polyol.

13. The solid catalyst component of claim 12, wherein the Lewis base is an alkyl ester of an aromatic carboxylic acid.

14. A catalyst system for use in the polymerization of α-olefins comprising a mixture of:
   (a) an organo aluminum catalyst component comprising an organo aluminum compound and a Lewis base; and
   (b) the titanium-containing solid catalyst component of claim 1.

15. A catalyst system for use in the polymerization of α-olefins comprising a mixture of:
   (a) an organo aluminum catalyst component comprising an organo aluminum compound and a Lewis base; and
   (b) the titanium-containing solid catalyst component of claim 2.

16. A catalyst system for use in the polymerization of α-olefins comprising a mixture of:
   (a) an organo aluminum catalyst component comprising an organo aluminum compound and a Lewis base; and
   (b) the titanium-containing solid catalyst component of claim 3.

17. A catalyst system for use in the polymerization of α-olefins comprising a mixture of:
   (a) an organo aluminum catalyst component comprising an organo aluminum compound and a Lewis base; and
   (b) the titanium-containing solid catalyst component of claim 4.

18. A catalyst system for use in the polymerization of α-olefins comprising a mixture of:
   (a) an organo aluminum catalyst component comprising an organo aluminum compound and a Lewis base; and
   (b) the titanium-containing solid catalyst component of claim 5.

19. A catalyst system for use in the polymerization of α-olefins comprising a mixture of:
   (a) an organo aluminum catalyst component comprising an organo aluminum compound and a Lewis base; and
   (b) the titanium-containing solid catalyst component of claim 6.

20. A catalyst system for use in the polymerization of α-olefins comprising a mixture of:

(a) an organo aluminum catalyst component comprising an organo aluminum compound and a Lewis base; and
(b) the titanium-containing solid catalyst component of claim 7.

21. A catalyst system for use in the polymerization of α-olefins comprising a mixture of:
   (a) an organo aluminum catalyst component comprising an organo aluminum compound and a Lewis base; and
   (b) the titanium-containing solid catalyst component of claim 8.

22. A catalyst system for use in the polymerization of α-olefins comprising a mixture of:
   (a) an organo aluminum catalyst component comprising an organo aluminum compound and a Lewis base; and
   (b) the titanium-containing solid catalyst component of claim 9.

23. A catalyst system for use in the polymerization of α-olefins comprising a mixture of:
   (a) an organo aluminum catalyst component comprising an organo aluminum compound and a Lewis base; and
   (b) the titanium-containing solid catalyst component of claim 10.

24. A catalyst system for use in the polymerization of α-olefins comprising a mixture of:
   (a) an organo aluminum catalyst component comprising an organo aluminum compound and a Lewis base; and
   (b) the titanium-containing solid catalyst component of claim 11.

25. A catalyst system for use in the polymerization of α-olefins comprising a mixture of:
   (a) an organo aluminum catalyst component comprising an organo aluminum compound and a Lewis base; and
   (b) the titanium-containing solid catalyst component of claim 12.

26. A catalyst system for use in the polymerization of α-olefins comprising a mixture of:
   (a) an organo aluminum catalyst component comprising an organo aluminum compound and a Lewis base; and
   (b) the titanium-containing solid catalyst component of claim 13.

* * * * *

UNITED STATES PATENT OFFICE
CERTIFICATE OF CORRECTION

Patent No. 4,253,984  Dated March 3, 1981

Inventor(s) Masafumi Imai et al

It is certified that error appears in the above-identified patent and that said Letters Patent are hereby corrected as shown below:

Column 13, line 62, please delete "ethyl benzoate" and substitute therefor ---ethyl p-anisate---.

Signed and Sealed this

Tenth Day of November 1981

[SEAL]

Attest:

GERALD J. MOSSINGHOFF

Attesting Officer  Commissioner of Patents and Trademarks